United States Patent [19]

Beauviala

[11] 3,761,646

[45] Sept. 25, 1973

[54] RECORDING AND READING DEVICE WITH HEAD MOVEMENT FOR COMPENSATION OF IRREGULARITIES IN TAPE SPEED

[76] Inventor: Jean Pierre Beauviala, 3, Avenue Hache, Grenoble, France

[22] Filed: Aug. 14, 1972

[21] Appl. No.: 280,714

Related U.S. Application Data

[63] Continuation of Ser. No. 43,542, June 4, 1970, abandoned.

[30] Foreign Application Priority Data

June 6, 1969 France .............................. 6918763

[52] U.S. Cl. 179/100.2 K, 179/100.2 S, 340/174.1 B

[51] Int. Cl.. G11b 15/22, G11b 15/52, G11b 21/02

[58] Field of Search ............... 179/100.2 K, 100.2 S, 179/100.2 CA, 100.1 S; 340/174.1 K, 174.1 A, 174.1 B; 178/6.6 P; 318/312, 314

[56] References Cited

UNITED STATES PATENTS

| | | | |
|---|---|---|---|
| 3,196,421 | 7/1965 | Grace et al. | 340/174.1 K |
| 3,286,243 | 11/1966 | Floros | 340/174.1 B |
| 3,252,147 | 5/1966 | Toscano | 340/174.1 K |
| 2,678,821 | 5/1954 | Masterson | 179/100.1 S |
| 2,997,697 | 8/1961 | Macadam | 340/174.1 B |
| 3,306,987 | 2/1967 | Guerth | 179/100.2 K |
| 2,854,526 | 9/1958 | Morgan | 179/100.2 S |
| 2,656,419 | 10/1953 | Dingley, Jr. | 179/100.2 S |
| R25,809 | 6/1965 | Johnson | 340/174.1 S |
| 3,488,452 | 1/1970 | Gunning et al. | 179/100.2 S |
| 3,347,997 | 10/1967 | Woodruff | 179/100.2 S |
| 2,960,568 | 11/1960 | Leyton | 179/100.2 S |

*Primary Examiner*—Bernard Konick
*Assistant Examiner*—Alfred H. Eddleman
*Attorney*—Eric H. Waters et al.

[57] ABSTRACT

This invention relates to a recording or reading device for electrical signals which are recorded on or read from a record carrier, such as a magnetic tape, which travels past a record and/or read head. The invention is directed to the problem of irregularities in the speed of travel of the record carrier past a record or read head, and provides means for compensating for irregularities in the speed of travel. Such means comprise a pulse generator whose instantaneous frequency is a function of the speed of travel of the record carrier, a master oscillator supplying reference frequency pulses, and a phase comparison device for comparing the two series of pulses and producing a compensating signal. The compensation may be effected by mechanical movement of the record/read head under the control of the output from the phase comparison device, or electronically by a deformation of the time scale of the signals to be recorded or read in order to cause it to conform to instantaneous variations in the speed of the carrier, or by a combination of both of these methods.

12 Claims, 4 Drawing Figures

Figure 1:
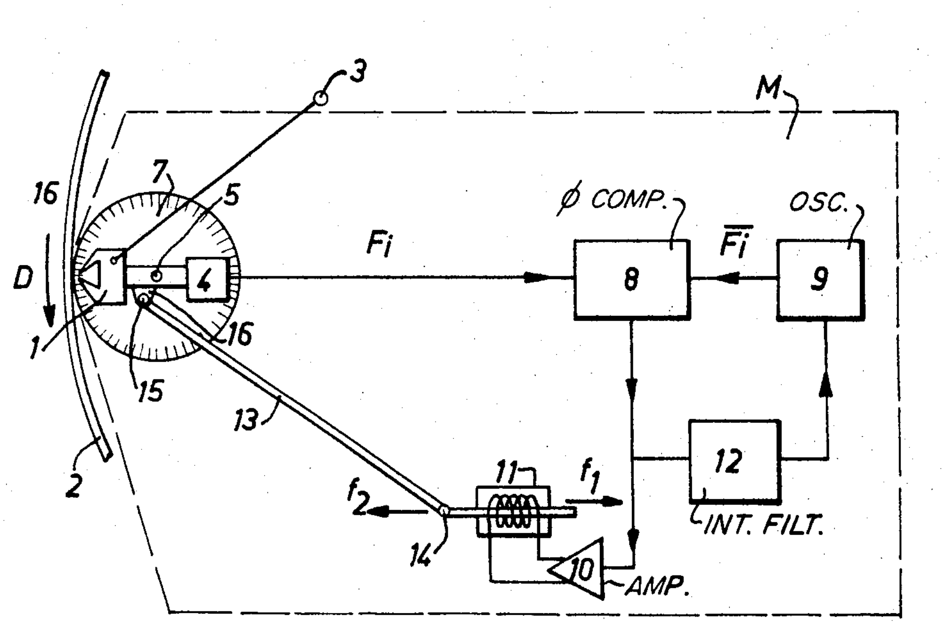

RECORDING AND READING DEVICE WITH HEAD MOVEMENT FOR COMPENSATION OF IRREGULARITIES IN TAPE SPEED

This is a continuation of application Ser. No. 43,542, now abandoned.

It is known that in order to record an electric signal evolving in time, a record carrier, such as a tape, disc, foil or drum, is caused to travel at a substantailly constant speed past a fixed recording head capable of recording the said signal on the carrier. In order to reproduce or read the signal, the recorded carrier is caused to travel, again at a substantially constant speed, past a fixed play-back or reading head. For the recording and reading to be accurate it is absolutely necessary that the speeds of travel of the record carrier are constant and, if possible, equal. To this end, speed regulation devices are used which are, in practice, often complicated and bulky and which are not always totally efficient.

The present invention has for an object to overcome or substantially reduce the disadvantages of existing devices and provides a recording and/or reading apparatus for electric signals particularly magnetically recorded signals, wherein, in order to insure accurate recording and reading, it is not sought to regulate to a constant value the speeds of travel of the record carrier, but in which the faults in regularity of travel of the record carrier are compensated.

To this end, according to the invention, a device for recording and/or reading an electric signal evolving in time on a record carrier by means of a suitable head is characterized in that it comprises an electric signal pulse generator whose instantaneous frequency is a function of the instantaneous speed of travel of the said carrier past the head, a master oscillator supplying a pulse signal having a reference frequency and a phase comparison device comparing the respective frequencies of the said generator and said oscillator in order to compensate for the faults in the regularity of travel of the said carrier.

Advantageously the said generator comprises a disc bearing equidistant marks around its periphery and driven in rotation by the said record carrier about an axis at right angles to the direction of travel of the carrier, for example by friction, together with a converter or coder transforming into an electric pulse each of the marks which travels past it. If the marks are opaque lines and the disc is transparent, the converter may be opto-electronic. Alternatively, if the marks are lines of a magnetic material and the disc is non-magnetic, the converter may be magneto-electronic.

Preferably, as will be explained hereinafter, the master oscillator is regulated to supply a signal whose frequency is equal to the average frequency of the instantaneous signals supplied by the said generator.

In a first embodiment of the invention, the reading or recording head is connected to the said converter in order to form therewith a movable assembly which may rotate about the axis of the disc carrying the marks and driven by a motor supplied by the output signal from the phase comparator.

Thus, it is possible to compensate for the faults in regularity of speed of the carrier. In fact, if the carrier accelerates, the output signal from the comparator is used so that the said head can shift in the same direction as the carrier and accompanies this latter. On the contrary, if the carrier decelerates, the output signal from the comparator is used so that the said head may shift in the opposite direction to that of the carrier and therefore passes in front of it.

Advantageously, the motor is a solenoid having an adjustable core connected to the said assembly by a system of rods.

Therefore, according to this first embodiment, compensation for faults in the regularity of speed of the carrier is obtained by the mechanical control of the position of the reading or recording head as a function of the relative speed of the carrier with respect to the said head.

However, in certain cases such a control arrangement does not have a sufficient performance in order to follow accurately and compensate for the said faults.

Therefore, according to a second embodiment of the invention, the mechanical regulation described above is replaced or supplemented by a treatment or deformation of the time scale of the signal to be recorded or read in order to cause it to conform to that which results from the instantaneous variations in the speed of the carrier. To this end, according to this second embodiment, the recording device comprises storage means, controlled by the said phase comparator, wherein the signal to be recorded is introduced according to a linear time scale and which emerges from the storage means according to a time scale conforming to that of the displacement of the carrier past the recording head.

Moreover, according to the second embodiment, the reading device comprises storage means controlled by the phase comparator wherein the signal read is introduced according to a scale conforming to that of the displacement of the carrier past the recording head and which emerges from the storage means according to a linear time scale.

Preferably in this second embodiment the analogue signal to be reproduced or recorded is sampled and transformed into a digital signal before its introduction into the said storage means, then re-transformed into an analogue signal at the output from the latter.

The said storage means may be formed by known means such as a logic memory having complex addressing, a delay line with series input and parallel addressable output, or a rotating delay line.

Preferably the phase comparator and the storage means form a shift register wherein the signal to be recorded (or to be reproduced) enters (or leaves) at the frequency of the osoillator and leaves (or enters) at the frequency of the said generator.

The shift register may comprise, on the one hand, a central device comprising n electronic elements, having two stable states connected in cascade between an input for a first pulse signal and an input for a second pulse signal both travelling step-by-step in opposite sense through the said device by successive triggerings of the said elements and, on the other hand, a regulated device for the circulation of information comprising at least one series of $n$ elements, also connected in cascade between an input and an output for information. Each of the said elements of the regulated device is controlled by one of the elements of the control device, of which each comprises first means operating so that a pulse of the first signal causes it to trigger from the first state to the second or maintains it in the said second state, second means operative so that a pulse from the second signal causes it to pass from the second state to the first or maintains it in the said first state, third means enabling, when it is triggered from the first state to the second state, to return the preceding element in the direction of propagation of the first signal from the second state to the first, and fourth means for sending a control pulse to the element associated with the regulator device when it triggers from the first state to the second.

In a preferred embodiment, the device regulated by the said shift register is also formed from elements having two stable states each of which comprises first means to receive the said control pulse, second means operative so that, when it receives this latter, a digit of a first type (for example I) causes it to pass from the first state to the second and so that a digit of the second type (for example O) retains it in the first state and third means allowing, when it triggers from the first state to the second, to reset the member which precedes it in the direction of movement of the digit from the second state to the first.

Figure 2:
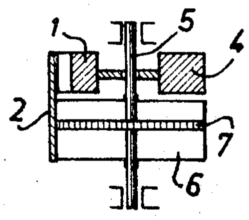
Figure 3:
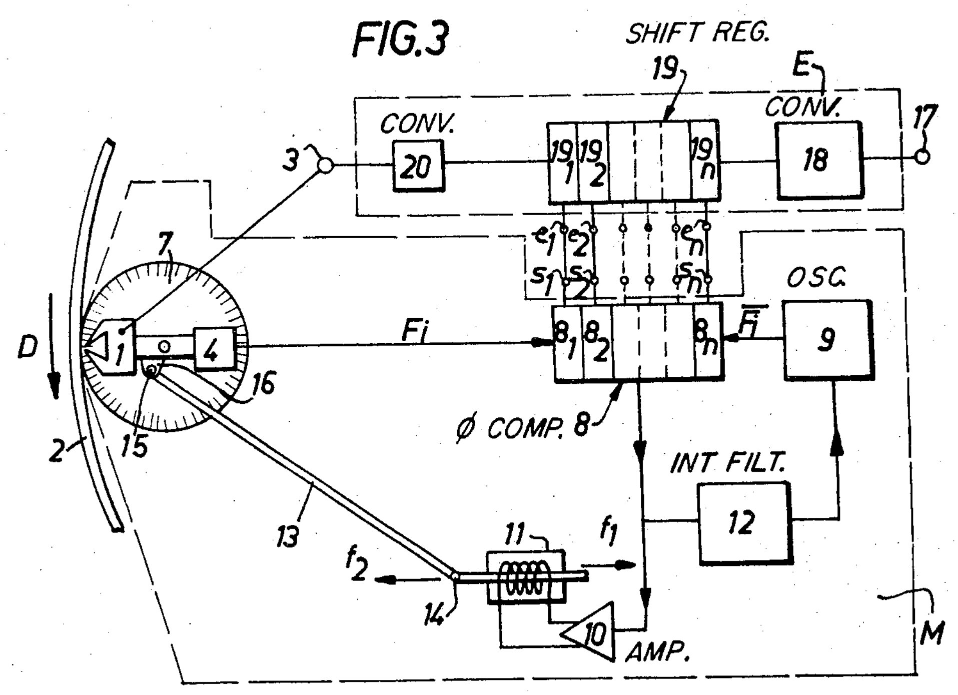
Figure 4:
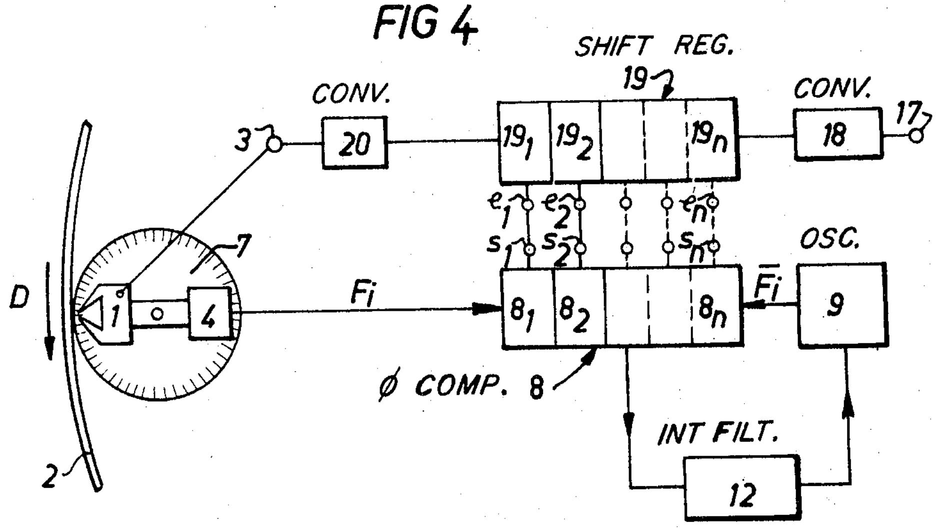

The invention will now be further described, by way of example, with reference to the accompanying drawings, in which:

FIG. 1 is a diagram of a reading and/or recording device according to one embodiment of the invention, FIG. 2 is a side view, in section, of an embodiment of an electric signal generator whose instantaneous frequency is a function of the speed of travel of the record carrier past the reading or recording head; and FIGS. 3 and 4 are respectively diagrams of further embodiments of the invention.

The recording device M shown diagrammatically in FIG. 1 comprises a recording head 1 receiving from the terminal 3 the information to be recorded on a carrier, for example a magnetic tape 2. The head 1 is connected to an optical converter 4 and the assembly which they form is freeely mounted with respect to a shaft 5 at right angles to the direction D of advance of the record carrier 2. This latter is pressed against a drum 6 carried by the shaft 5 which rotates in bearings. The drum 6 carries a disc 7 provided with equidistant marks on its periphery and which can move with respect to the optical converter 4 (see FIG. 2).

The output from the optical converter 4 is connected to one of the inputs of a phase comparator 8 whose other input is connected to the output from a master oscillator 9. The output from the phase comparator 8 is connected both to an amplifier 10 controlling a motor 11 and to an integrator filter 12 controlling the master oscillator 9. The motor 11, is, for example, a solenoid whose adjustable core is capable of being actuated in a reciprocating fashion, by rods 13 articulated to the said core at pin 14 and to the rotary assembly including parts 1 and 4. The said rods are, more particularly, articulated by pin 15 to a crank 16 accentric relative to the assembly of parts 1 and 4.

Therefore, when the record carrier 2 is moved in direction D, it drives the drum 6 in rotation and the marks on the disc 7 pass in front of the converter 4. This latter therefore generates an electric pulse signal whose instantaneous frequency $F_i$ corresponds to the instantaneous frequency of travel of the marks of the disc 7 past the converter 4, and thus to the speed of travel of the support 2. If the master oscillator 9 omits an electric pulse signal having a reference frequency F, corresponding, for example, to the desired value of $F_i$ in the case where the tape 2 is travelling at a substantially constant speed, the phase comparator 8 omits at its output an error signal supplying the motor 11.

Should the speed of travel of the record carrier 2 increase, the error signal issuing from the phase comparator 8 actuates the motor 11 so that the adjustable core of motor 11 is shifted in the direction $f_1$. This in turn moves the rod system 13 so that the recording head 1 is shifted in the direction of travel D of the said record carrier and the recording head therefore accompanies the record carrier so as to compensate for its increase in speed.

Similarly, when the speed of the record carrier 2 decreases, the core of the motor 11 is caused to move in the direction of arrow $f_2$, which through the rod system 13 actuates the head 1 so that it moves in the opposite direction to that of the record carrier and compensates for its decrease in speed.

The device of FIG. 1 therefore compensates for the effects of variations of speed of the recording carrier 2. However, if these variations in speed become too great with respect to the speed corresponding to the signal omitted by the oscillator 9, the head 1 would have a movement of rotation of too great an amplitude which would again possibly be insufficient to compensate for the variations in speed of the record carrier.

In order to remedy this drawback, the frequency of the reference signal of the oscillator 9 is adjusted to the mean frequency $F = F_i$ of the signals of frequency $F_i$. This regulation takes place by means of the integrator filter 12. However it could also be effected directly from the frequency $F_i$. The choice of the integration constant is made as a function of the fluctuation of speed tolerated for the carrier 2. Therefore, the signals of frequency $F_i$ measure the relative speed of the support with respect to the recording head.

Although the embodiment of FIG. 1 has been described with respect to a recording device, it is obvious that a reading device according to the invention would be similar in all respects except that the terminal 3 would be an output terminal for the information read and no longer the input terminal for information to be recorded.

The device which has just been described for mechanically regulating a reading or recording head as a function of the relative speed of the carrier with respect to that of the said head, hardly allows fluctuations in speed of the carrier beyond 50 to 100 Hz to be eliminated. If more exact compensation is required one may use a device such as is shown in FIG. 3. This device, in addition to regulating the position of the recording or reading head with respect to the record carrier, modifies the time scale of the signals to read out or recorded in order to make it conform to the movement of the carrier.

The recording device shown in FIG. 3 comprises a regulation device M similar to that of FIG. 1. In addition, it includes between the terminal 3 and the terminal 17 an electric regulating device E comprising, in series, an analogue-to-digital converter 18, a shift register 19 controlled by the phase comparator 8 and a digital-to-analogue converter 20. An analogue signal is applied to the terminal 17 is then sampled and transformed into a digital signal by the converter 18, then stored in the shift register 19, and is then retransformed into an analogue signal by the converter 20. On the other hand, if the device according to FIG. 3 is intended for reading, the converter 20 would be an analogue-to-digital converter and the converter 18 a digital-to-analogue converter. Therefore, an analogue signal generated by the reading head 1 is sampled and transformed into a digital signal by the converter 20, and is then stored in the register 19 and decoded into an analogue signal by the converter 18. A reconstituted analogue signal therefore appears on the output terminal 17.

The phase comparator 8 of the device according to FIG. 3 is of the type comprising a plurality of elements $8_1, 8_2, \ldots 8_n$ connected in cascade and each provided with an output terminal $s_1, s_2 \ldots s_n$ on which two different electric states may appear, according to the respective progressions in opposite directions of the pulses from the signal $F_i$ and those from the signal $\overline{F}_i$.

The shift register 19 is of the type comprising a plurality of elements $19_1, 19_2, \ldots 19_n$ connected in cascade and each provided with an input terminal $e_1, e_2 \ldots e_n$, each of which is connected to the terminal $s_1, s_2 \ldots s_n$ of corresponding value. Digits can be transferred step-by-step from $19_n$ to $19_1$ (recording device) or from $19_1$ to $19_n$ (reading device) by following respectively the progression of the pulses from the signal $\overline{F}_i$ or those from the signal $F_1$.

Thus in the case of a recording device, the signal is introduced into the register 19 at the rate of the pulses $\overline{F}_i$ and is extracted therefrom at the rate of the pulses $F_i$. Conversely in the case of a reading device, the signal is introduced into the register 19 at the rate of the pulses $F_i$ and is extracted therefrom at the rate of the pulses $\overline{F}_i$.

The device according to FIG. 3 thus comprises the two methods of compensation mentioned above by virtue of the device M and device E.

In the device according to FIG. 4, the mechanical compensation components, 10, 11 and 13 to 16 have been omitted and only electrical compensation is effected by the registers 8, 19. In this embodiment the head 1 and the converter 4 are fixed and the disc 7 rotates so as to cause its marks to travel in front of the said converter 4.

I claim:

1. A device for recording and/or reading an electric signal evolving in time on a record carrier by means of a record/read head, said device comprising an electric pulse signal generator means whose instantaneous frequency is a function of the instantaneous speed of travel of the said carrier past the head, an oscillator adapted for supplying a variable frequency pulse signal, an integrator means, a phase comparator means for comparing the respective frequencies of the said generator means and the said oscillator and coupled by said integrator means to said oscillator and controlling said oscillator in order to cause the oscillator to supply a signal whose frequency is equal to the average frequency of the instantaneous signals supplied by the said generator means, and further means responsive to said comparator means for adjusting said electric signal according to the comparison of said frequencies and thereby to the speed of said tape, said oscillator generating frequencies corresponding to the means speed of said tape.

2. A device as claimed in claim 1 wherein said head is displaceable, comprising means responsive to said phase comparator means for displacing said head relative to said carrier.

3. Reading device according to claim 1 wherein said further means comprises storage means controlled by the said phase comparator means and wherein a signal to be read is introduced into the storage means at a frequency corresponding to the frequency of the signal from the generator means and emerges from the storage means at a frequency corresponding to the frequency of the said oscillator.

4. Reading device according to claim 3 wherein said further means comprises a digital-to-analogue converter on the input side of said storage means and an analogue-to-digital converter on the output side of said storage means.

5. A device according to claim 1, wherein the said generator means comprises a disc carrying equidistant marks around its periphery and which is driven in rotation by the said record carrier about an axis at right angles to the direction of travel of the carrier, and a converter transforming each of the marks which travel past it into an electric pulse, and wherein the said head is attached to the said converter in order to form therewith a movable assembly which can rotate about the axis of the disc, said device further comprising a motor supplied by the output signal from the phase comparator means, said motor driving said movable assembly.

6. A device according to claim 5 wherein the motor is a solenoid including a rod system and an adjustable core connected to the said assembly by said rod system.

7. Recording device according to claim 1 wherein said further means comprises storage means controlled by the said phase comparator means and wherein a signal to be recorded is introduced into the storage means at a frequency corresponding to the frequency of the said oscillator and emerges from the storage means at a frequency corresponding to the frequency of the signal from the said generator means.

8. Recording device according to claim 7 wherein said further means comprises an analogue-to-digit converter on the input side of said storage means and a digitial-to-analogue converter on the output side of said storage means.

9. A device according to claim 8, wherein the device regulated by the said shift register includes elements having two stable states each of which comprises first means to receive the said control pulse, second means so that when it receives this control pulse, a digit of a first type causes it to pass from the first state to the second state and so that a digit of second type retains it in the first state and third means enabling when it changes from the first state to the second state to reset the element which precedes it in the direction of movement of the digits, from the second state to the first state.

10. Recording device according to claim 7 wherein the phase comparator means and the storage means forms a shift register and wherein the signal to be recorded enters the shift register at the frequency of the oscillator and emerges at the frequency of the generator means, said device further comprising a control device comprising $n$ electronic elements having two stable states connected in cascade betwen an input for a first pulse signal and an input for a second pulse signal both moving step-by-step in opposite sense through the said device by successive triggering of the said elements and a regulated device for the circulation of information comprising at least one series of $n$ elements also connected in cascade between an input and an output for information, each of the said elements of the regulated device being controlled by one of the elements of the control device, each of which comprises first means so that a pulse from the signal causes it to change from the first state to the second state or maintains it in the said second state, second means so that a pulse from the second signal causes it to pass from the second state to the first state or maintains it in the said first state, third means enabling, when it changes from the first state to the second state, to reset the element which precedes it in the direction of propagation of the first signal from the second state to the first state and fourth means sending a control pulse to the element associated with the said regulated device when it changes from the first state to the second state.

11. A device according to claim 10 wherein the device regulated by the said shift register includes elements having two stable states each of which comprises first means to receive the said control pulse, second means so that when it receives this control pulse, a digit of a first type causes it to pass from the first state to the second state and so that a digit of a second type retains it in the first state and third means enabling when it changes from the first state to the second state to reset the element which precedes it in the direction of movement of the digits, from the second state to the first state.

12. A device according to claim 10 wherein the phase comparator means and the storage means form a shift register and wherein the signal to be reproduced enters the shift register at the frequency of the generator and emerges at the frequency of the oscillator, said device further comprising a control device comprising $n$ electronic elements having two stable states connected in cascade between an input for a second pulse signal both moving step-by-step in opposite sense through the said device by successive triggering of the said elements and a regulated device for the circulation of information comprising at least one series of $n$ elements also connected in cascade between an input and an output for information, each of the said elements of the regulated device being controlled by one of the elements of the control device, each of which comprises first means so that a pulse from the first signal causes it to change from the first state to the second state or maintains it in the said second state, second means so that a pulse from the second signal causes it to pass from the second state to the first means enabling, when it changes from the first state to the second state, to reset the element which precedes it in the direction of propagation of the first signal from the second state to the first state and fourth means sending a control pulse to the element associated with the said regulated device when it changes from the first state to the second state.

* * * * *